United States Patent [19]
Weingartner et al.

[11] Patent Number: 5,405,178
[45] Date of Patent: Apr. 11, 1995

[54] FIRE RESISTANT VEHICLE SEAT

[75] Inventors: Rudolf Weingartner, Neuhofen an der Krems; Johann Möseneder, Grieskirchen, both of Austria

[73] Assignee: C.A. Greiner & Söhne Gesellschaft m.b.H., Kremsmünster, Austria

[21] Appl. No.: 910,362

[22] PCT Filed: Jan. 10, 1991

[86] PCT No.: PCT/AT91/00006
§ 371 Date: Jul. 17, 1992
§ 102(e) Date: Jul. 17, 1992

[87] PCT Pub. No.: WO91/10383
PCT Pub. Date: Jul. 25, 1991

[30] Foreign Application Priority Data
Jan. 18, 1990 [AT] Austria .................. 107/90
Feb. 15, 1990 [AT] Austria .................. 357/90

[51] Int. Cl.⁶ .................................. A47C 7/02
[52] U.S. Cl. .................. 297/452.48; 297/DIG. 5; 297/DIG. 1; 297/452.1
[58] Field of Search ........... 297/452.1, 452.48, 452.55, 297/452.58, DIG. 1, DIG. 5

[56] References Cited
U.S. PATENT DOCUMENTS

| | | | |
|---|---|---|---|
| 3,222,698 | 12/1965 | Levenson | 297/452.48 |
| 4,092,751 | 6/1978 | Burkholder et al. | 297/452.48 |
| 4,627,664 | 12/1986 | Okazaki et al. | |
| 4,880,276 | 11/1989 | Shovar | 297/452.55 |
| 5,085,487 | 2/1992 | Weingartner | 297/452.1 |
| 5,142,757 | 9/1992 | Thary | 297/452.48 |
| 5,176,424 | 1/1993 | Tobita et al. | 297/DIG. 1 |
| 5,235,826 | 8/1993 | Brooks et al. | 297/452.58 |
| 5,248,185 | 9/1993 | Weingartner | 297/452.58 |

FOREIGN PATENT DOCUMENTS

| | | |
|---|---|---|
| 0190064 | 8/1986 | European Pat. Off. |
| 3111839 | 10/1982 | Germany |
| 3506816 | 5/1985 | Germany |
| 8713357 | 10/1987 | Germany |
| WO86/03164 | 6/1986 | WIPO |
| WO88/09731 | 12/1988 | WIPO |

Primary Examiner—Clifford D. Crowder
Assistant Examiner—Bibhu Mohanty
Attorney, Agent, or Firm—Collard & Roe

[57] ABSTRACT

A seat for use in a vehicle is disclosed which is flame resistant. The seat comprises a foam plastic cushion having an supporting member of open cell resilient foam, an intermediate layer of high temperature-resistant threads forming a network, and a flame-proof layer of an open-cell resilient foam impregnated with a liquid flame proofing agent. The supporting member and the intermediate layer are bonded by an adhesive. A flame-resistant upholstery material covers the seat surface. A facing layer of flame-proof fabric is applied to the supporting member on the underside of the cushion.

10 Claims, 6 Drawing Sheets

FIRE RESISTANT VEHICLE SEAT

The invention relates to a seat comprising a foam plastics cushion having a seat surface, an underside remote from the seat surface and side surfaces between the seat surface and the underside, the side surfaces defining edges with the seat surface and the underside. The cushion comprises a supporting member of an open-cell resilient plastics foam having a first specific gravity, the supporting member having a top surface facing the seat surface, an intermediate layer of high temperature-resistant threads forming a network arranged on the top surface of the supporting member, and a flame-proof layer of an open-cell resilient plastics foam impregnated with a liquid flame-proofing agent and having a second specific gravity different from the first specific gravity, the flame-proof layer covering the intermediate layer. The supporting member and the intermediate layer, and the intermediate layer and the flame-proof layer are respectively bonded to each other by an adhesive at regions distributed over the surfaces thereof, and the intermediate layer and the flame-proof layer extend at least along the seat surface, and preferably over the side surfaces of the cushion. The cushion also has a flame-resistant upholstery material covering the seat surface, the side surfaces and the underside of the cushion. Such a seat is known from U.S. Pat. Nos. 5,085,487 and 5,248,185. These seats meet the safety requirements and test regulations, particularly for use in aircraft, but the construction makes it difficult to fit an interchangeable facing layer, capable of being removed from the seat and re-inserted at frequent intervals for routine cleaning. In addition, the seat is constructed so that the cushion has low resistance to mechanical stresses, since the connection between the individual parts of the flame-proof layer is subjected to high stresses which often result in destruction thereof.

Other known seats for public means of transport, e.g. from German utility model 85 06 816, comprise a seat cushion covered by a seat cover, the seat cover and the seat cushion being made of low-flammable, low-fuming material. Often the process consists in disposing a glass fibre mat, preventing the seat cover from burning through in the direction of the cushion, between the low-flammable seat cover and the seat cushion, which is usually made of plastics foam. It has been found, however, that in many cases the flame acts from the ground and the plastics foam in the seat cushion tends to burn and discharge dense fumes, so that if a fire occurs the public means of transport quickly becomes so smoke-filled that the occupants have difficulty in finding their way. In the case of this known seat, therefore, a fire-inhibiting plate is disposed in the seat supporting frame under the seat cushion. This means that a special section member must be used to hold the seat cushion, and there is the additional expense of installing the fire-inhibiting plate. In this embodiment also, the seat is not adequately ventilated.

Seats with foam plastics cushions are very widely used in modern vehicle construction, particularly in rail and road vehicles and also to a predominating extent in aircraft. The specifications for rail vehicles set very strict guidelines regarding evolution of fumes or the materials used, which must be self-extinguishing, but the specifications for the aircraft industry are still more strict. For example, seats licensed for use in aircraft must undergo a test in which the cushion, in the fitting provided for installation, is directly exposed to a flame from a burner. The flame acts directly on the cushion for two minutes, after which the flame is extinguished or removed. The cushion is extinguished after five minutes, if the flame has not gone out by itself. After this burning test the weight lost by the cushion must not be higher than 10%. In order to comply with these extremely strict specifications and also to obtain low weight and a very comfortable seat during lengthy aircraft journeys, various open-cell resilient soft foam materials having different specific gravities and comprising flame retardants are stuck together.

A known vehicle seat of this kind (as per EP-A1 190 064) comprises a number of layers of needled nonwoven fabric enveloped in a flameproof cover. To reduce damage by vandals, reinforcing mats of metal or glass fibres are disposed between the seat cover and the individual layers of needled nonwoven material. This vandal-proof layer has a number of intermediate strata and the individual layers are stuck together, with the result that the known vehicle seat is even more difficult to ventilate adequately.

In the case of another known seat for aircraft, in order to simplify the complicated spatial shape given to the seat cushions, the supporting member is a part foamed in one piece in a mould and mixed with flame retardants, the surface of the parts being covered with a flame-retarding layer and then with a flameproof cover. The known seat, however, cannot meet the new severer safety regulations and test specifications for aircraft seats.

In the case of another known vehicle seat, according to DE-A 31 11 839, a hard foam shell or a supporting frame is provided with tension springs, on which a seat cushion made up of one or more foam supports is disposed. The foam layers can be of low-flammable material. The seat cushion is enveloped in a flame-retarding sheath and, on the side facing the user, has a low-flammable fabric cover. The use of low-flammable materials and a flame-retarding cover slightly improves the ignition behaviour, but this construction cannot reduce the loss in volume when an open flame acts on the various layers of foam.

The object of the invention is to provide a seat for vehicles, more particularly means of transport such as road vehicles or aircraft, which has a minimum weight, adequate permeability to air and is comfortable to sit upon and offers high resistance to ignition and evolves little smoke when exposed to a direct flame for a long time.

Additionally or independently, the invention is based on the problem of designing a seat which enables a joining device to be strongly secured in order to hold the seat cover on the cushion.

This problem according to the invention is also solved by providing a facing layer of a flame-proof fabric applied to the supporting member on the underside of the cushion. The facing layer is preferably adhesively bonded to the supporting member, and preferably overlaps the flame-proof layer at the edges defined by the side faces and the underside as well as the seat surface. The advantages of this novel solution are that, since a facing layer made of flameproof woven or knitted or nonwoven fabric is disposed on the underside of the seat cushion, the total weight of the seat cushion can advantageously be reduced without substantially altering the ignition or smoke-inhibiting properties. At the same time the resistance of the seat cushion to mechanical stresses is increased in unpredictable manner, since the underside, which is usually given a very complex shape, can be covered with a seamless facing layer. At the same time the facing layer connected to the supporting member is more resistant to tensile stresses exerted by the devices for retaining the seat cover on the facing layer, as compared with the flame-retarding layer previously used in this region, since the loads, some of which occur at a point, are distributed over a larger area of the facing layer and are also transmitted to the joining layer, e.g. the layer of adhesive between the facing layer and the supporting member. This advantageously prevents the facing layer coming loose from the supporting member when the seat cover is taken off for cleaning. On the other hand the properties of the structure of the seat cushion in the neighbourhood of the seat surface, which have been shown to be particularly advantageous, can be retained unaltered. The main advantages are that the flame-retarding layer, which is relatively open-pore, can be very efficiently cleaned and provides a comfortable seat, since it can absorb a large quantity of body exhalations or moisture, and gives them off when the seat is unoccupied. As a result the user has a very comfortable seat. In addition, since the edge region is covered, the end-face joints between the individual strata of the flame-retarding layer and the adhesive layers there can also be covered, so that if the adhesive layer in these regions is exposed to flame, it is reliably prevented from burning through, and the stuck joints do not burst under strong stress.

According to another embodiment the intermediate layer extends between the supporting member and the facing layer at the underside of the cushion. As a result of this embodiment, the total weight of an aforementioned seat cushion can be considerably increased and the ignition properties of the seat cushion can be improved even when exposed to flame from underneath the seat.

In another embodiment, by means of which the manufacturing costs can be reduced and the joint between the supporting member and the facing layer can be further improved in advantageous manner the supporting member is foamed on the facing layer to form an integral unit therewith.

If the cushion further comprises reinforcing overlays at regions of the facing layer at a side thereof remote from the supporting member, it enables the facing layer to be partially reinforced in weight-saving manner for adaptation to the various areas under load, more particularly in those regions in which the seat cushion rests on a supporting frame.

According to another embodiment the cushion further comprises a spring core incorporated in the supporting member, which spring core comprises several spring parts connected at joints, and the reinforcing overlays on the facing layer are in alignment with the joints. This is also advantageous, since it enables the thickness of the supporting member between its underside and the underside of a spring core next to the facing layer to be kept at a minimum, while still giving the seat cushion a maximum service life.

A feature comprising burr strips on the facing layer at a side thereof remote from the supporting member for securing the flame-resistant upholstery material covering is also advantageous, since this can advantageously increase the resistance to tearing-out of the retaining device, more particularly the burr strips.

According to another aspect, the invention provides a seat comprising a foam plastics cushion, a facing layer on said cushion, the facing layer being formed partly of synthetic fibers, and a joining device, such as a burr strip, connected to the facing layer, the joining device comprising a substrate strip of a fabric containing at least some heat-deformable material hot-bonding the joining device to the facing layer. It is possible to use either a burr strip joining device or other such devices, as for example slide fasteners, hooks, lugs or the like. The advantages of this solution are that the joining device, more particularly the burr strip, can be positioned with high accuracy, using simple technical aids, on the supporting member provided with the facing layer. A surprising feature is that if the device for positioning the burr strip is suitably heated, it or a substrate tape for the joining device melts in the regions made of heat-deformable material and is permanently joined to the facing layer, and it is technically easy to dimension the regions in accordance with the requirements on resistance to tearing out. Another advantage is mainly that it is also possible for the joining device or a substrate strip to be permanently connected directly to the foam-plastics supporting member without using the facing layer, though this usually requires larger connecting areas.

A substrate strip made of polyamide can be used for welding to the facing layer, with application of pressure and temperature.

Another embodiment is a joining device which is a burr strip comprising said substrate and thermally deformed anchoring elements thereon The anchoring parts, more particularly a burr strip, disposed on a joining device can be thermally deformed, so that the permanent joint can be made without adding additional welding material.

If the joining device is connected to the facing layer at joining regions disposed in a grid over the surface of the joining device the retaining force of a joining device can be reduced if necessary in surprisingly simple manner, by partly melting away the anchoring parts.

The invention will be more clearly understood from the following detailed description of embodiments shown in the drawings, in which.

Figure 1:
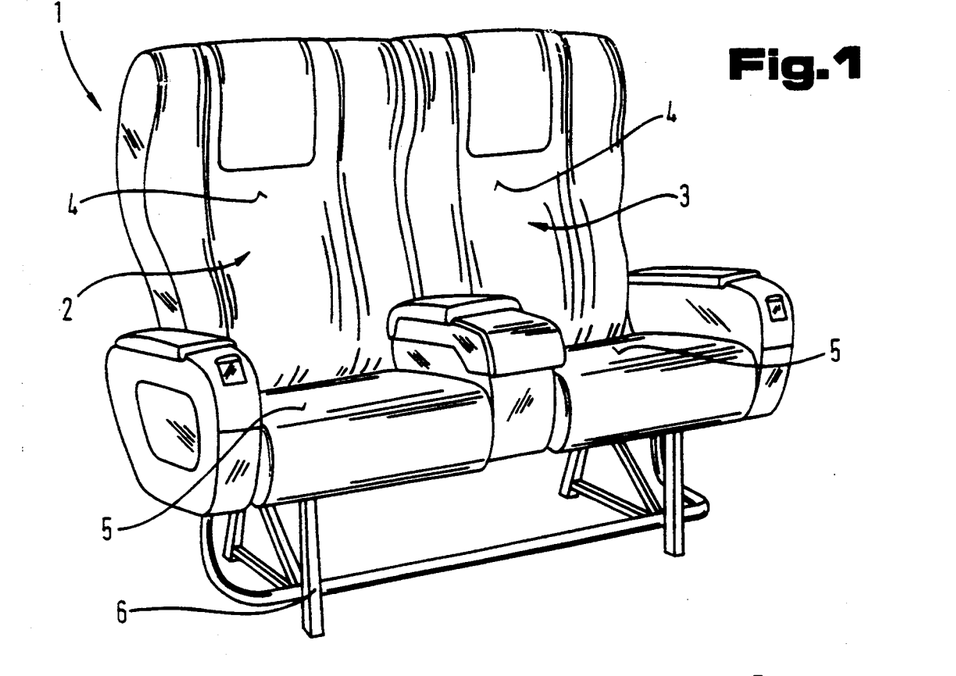
FIG. 1 shows a double sofa seat comprising two seats according to the invention fore two persons and in perspective view.

FIG. 1 shows a double sofa seat 1 comprising two seats 2 and 3. Each seat 2, 3 comprises a cushion 4 for a back rest and a cushion 5 for a seat surface. The cushion 4 and the seat cushion 5 of the two seats 2 and 3 are of identical construction but in mirror arrangement. Alternatively they can be used for a single seat or a multiple sofa seat. Alternatively also, a seat 2 or 3 can comprise one or more cushions.

Cushion 4 and seat cushion 5 are inserted in a supporting frame (general reference 6). The frame 6 can also have any other suitable shape.

Figures 2, 3:
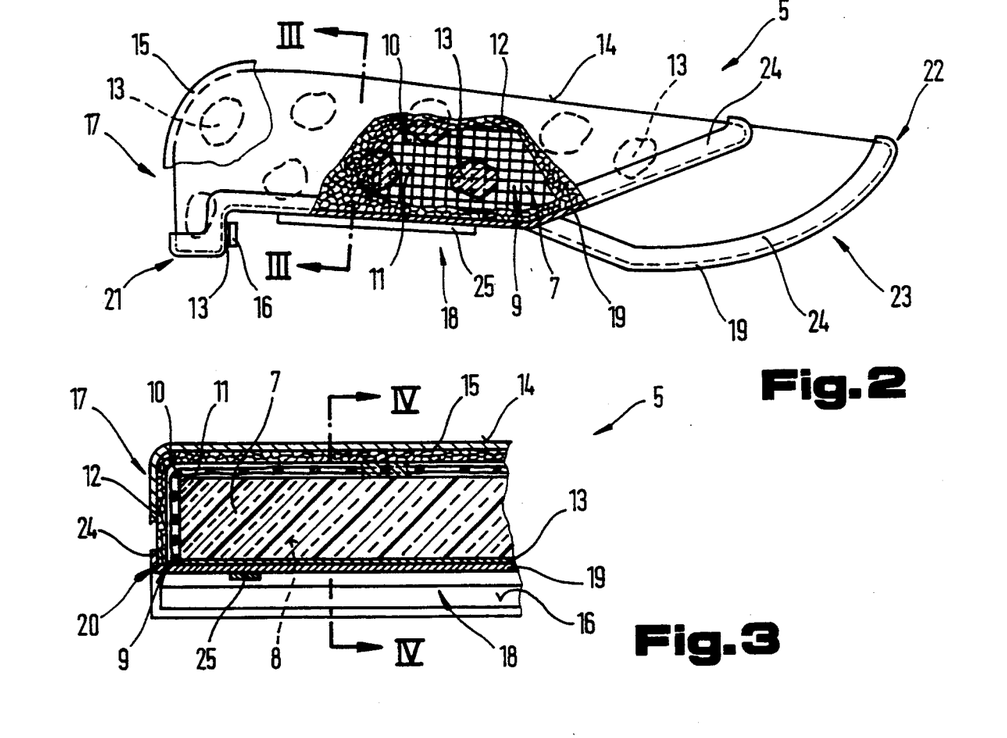
FIG. 2 is a side view of a seat cushion for a surface of the seat in FIG. 1.
FIG. 3 is a front view of the cushion for the seat surface, in section along lines III—III in FIG. 2.

FIGS. 2 and 3 show the seat cushion 5, which forms a seat surface. The cushion 5 comprises a supporting member 7, which is preferably made of a moulded cold-curing foam and is manufactured in a mould corresponding to the desired outer dimensions of the supporting member 7. It is made of a resilient open-cell synthetic foam, and is preferably in one piece. The synthetic foam, as diagrammatically indicated by short lines in the shaded region, can be mixed with a pulverulent flame retardant 8, such as melamine resin and/or aluminium hydroxide. An intermediate layer 9 of high temperature-resistant threads 10, 11 laid in a lattice or network is disposed on the upper surface of the supporting member 7. The intermediate layer 9 is covered by a flame-retarding layer 12, which is disposed on the side of layer 9 remote from member 7. The flame-retarding layer 12 is impregnated with a liquid flame retardant, containing e.g. chlorine, bromine or phosphorus. Advantageously the liquid flame retardant is mixed with hydrated aluminium oxide having a particle-size distribution preferably between 0.2 and 110 μm. The flame-retarding layer 12 preferably comprises a polyether, and the foam plastics forms part of a plastics foam block which is subsequently impregnated with a liquid flame retardant. The flame-retarding layer 12, the intermediate layer 9 and the supporting member 7 are interconnected by an adhesive 13 at places distributed over the surface, so that the air flow through the seat cushion 5 is not appreciably reduced by the adhesive 13. The flame-retarding layer 12 on the seat surface 14 is covered by a low-flammable seat cover 15. The seat cover 15 is connected to the seat cushion 5 by burr strips 16, which can be disposed in the region of a recess in the flame-retarding layer 12. The intermediate layer 9 and the flame-retarding layer 12 envelop the supporting member 7 in the region of the seat surface 14 next to the person using the seat, i.e. also in the region of the side surfaces 17. The low-flammable seat cover 15 may also cover these areas of cushion 5 or the entire cushion. Alternatively, owing to the construction of the seat cushion 5 according to the invention, the low-flammable seat cover can be omitted in those regions which are invisible, e.g. underneath the sofa seat.

The intermediate layer 9, which can e.g. also be a knitted or woven or nonwoven fabric or network or lattice, preferably has a mesh width of threads laid in a lattice or network of about 0.5 to 8 mm, preferably 3 mm.

As also shown in FIGS. 2 and 3, a facing layer 19 is disposed on an underside 18 of the seat cushion 5. The facing layer comprises a flameproof woven or knitted or nonwoven fabric made of non-flammable or low-flammable fibres. Low-flammable substances of this kind usually comprise a combination of cotton and polyester, e.g. 81% cotton and 19% polyester or alternatively 59% wool, 33% cotton and 8% polyester.

The facing layer 19 is connected to the supporting member 7 by an adhesive 13, e.g. a continuous layer or at individual spots, as shown in FIG. 2 in the case of the intermediate layer 9 or the flame-retarding layer 12. Alternatively of course the supporting member 7 can be foamed directly on to the facing layer 19. In that case the facing layer 19 must be placed in a suitable foaming mould before the supporting member 7 is manufactured.

It has also been found advantageous if the facing layer 9 covers or extends over edges 20–23 between the side surfaces 17 and/or the underside 18. As a result of these parts 24 of the facing layer 19, which project over the side surfaces 17 and/or the seat surface 14, the layers of adhesive 13 can be covered between the supporting member 7 or facing layer 19 and the flame-retarding layer 12 or between the supporting member 7 and, if required, the intermediate layer 9. On exposure to flame, this prevents the flames igniting the adhesive and penetrating into the seat cushion 5. Also, this overlapping arrangement of parts 24 of the facing layer 19 reliably prevents the flame-retarding layer 12 or the intermediate layer 9 coming loose from the supporting member 7. This considerably increases the loading capacity of the seat cushion 5, more particularly when the flameproof seat cover 15 is replaced, and also improves the safety of passengers in the event of a fire in the means of transport, since even after prolonged use, the seat cushions 5 still have the service lives prescribed by the various test authorities.

As also shown, the burr strips 16 of a device for retaining the flameproof seat cover 15 are disposed on the side of the facing layer 19 remote from the supporting member 7. The burr strips can be connected to the facing layer 19, preferably by a layer of adhesive 13. The advantage of this method is that the facing layer 19, which is connected to the supporting member 7 over a large area, reliably prevents the cover layer 19 being loosened by the tensile forces which occur in the region of the burr strip 16 when the flameproof seat cover 15 is loosened, and which are partly restricted to points on small areas.

As an alternative means of protecting the facing layer 19, reinforcing supports 25 can be provided, likewise on the side remote from the supporting member 7, so as to prevent the facing layer 19 becoming frayed or damaged or torn at the place where the seat cushion 5 rests on the supporting frame 6.

Figure 4:
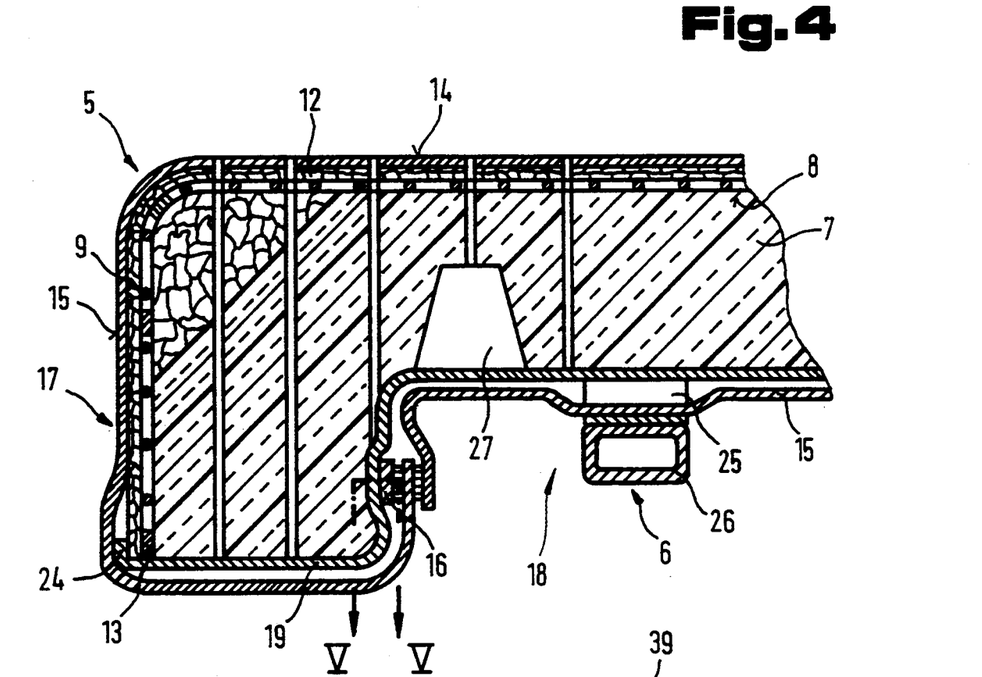
FIG. 4 shows part of the cushion in side view and on a larger scale, in section along lines IV—IV in FIG. 3.

FIG. 4 is a larger-scale view of the front corner region of the seat cushion 5. As shown even better in FIG. 4, the seat cover 15 is moved out over the parts 24 of the facing layer 19 overlapping the side surface 17. As also shown, a flameproof seat cover 15 can be disposed on the underside 18 of cushion 5 in addition to the facing layer 19. As already described with reference to FIG. 3, it may be advantageous to dispose reinforcing supports 25 on the facing layer 19, so as to rest layer 19 on a spar 26 of the supporting frame 6.

As also shown very clearly by FIG. 4, the parts 24 of the facing layer 19 projecting beyond the side surfaces 17 can also protect the end face of the layer of adhesive disposed between the supporting member 7 and the flame-retarding layer 12.

In this embodiment also, the flame retardant 8 in the supporting member 7 is indicated by broken lines.

As also shown in this embodiment, the supporting member 7 can have recesses 27, e.g. caverns.

Alternatively the seat cushion 5 can be pierced with needles, e.g. after manufacture, so as to form continuous openings (shown with disproportionately large diameter in the present embodiment) for dissipating heat and moisture from the region of the seat surface 14.

Figure 5:
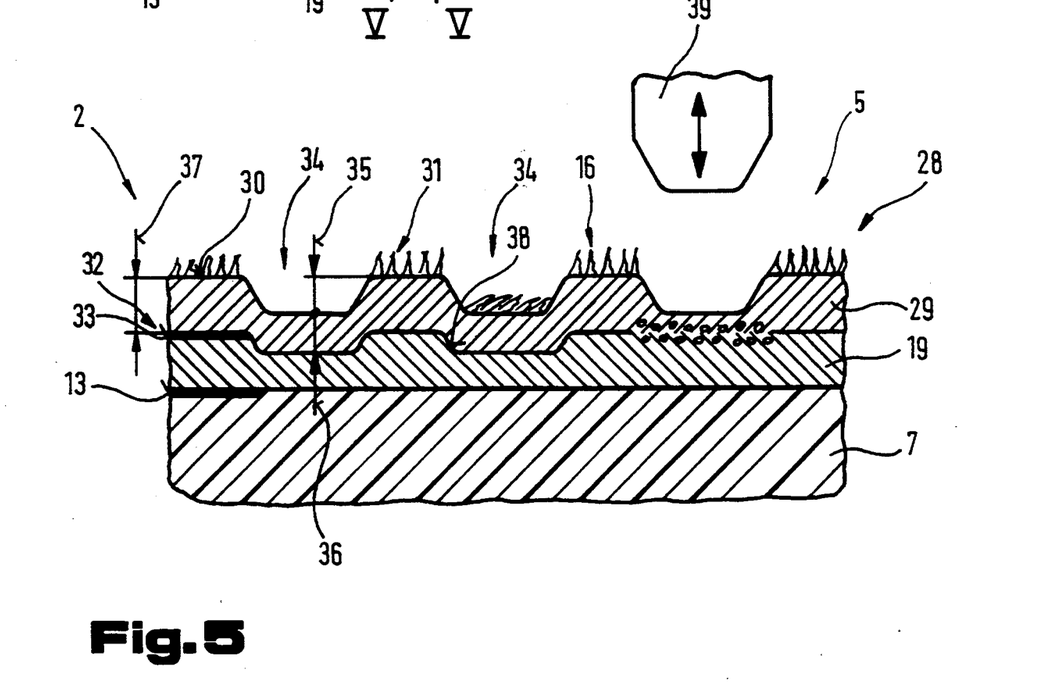
FIG. 5 shows the joining regions in front view and in section along lines V—V in FIG. 4.

FIG. 5 shows a joining device 28 and burr strip 16. The foam plastics supporting member 7 is connected to the facing layer 19 by adhesive 13. The burr strip 16 has a substrate strip 29 made of heat-deformable material, e.g. polyamide. Anchoring parts 31, e.g. a hooked pile of plastics or nylon fibres, are disposed on the substrate strip 29 on a surface 30 remote from the facing layer 19. An e.g. heat-activatable adhesive 33 is disposed on a joint surface 32 on the substrate strip 29 towards the facing layer 19. In the joining regions 34 the substrate strip 29 is heat-deformed in the direction of the facing layer 19, the depth 35 and the thickness 36 of the substrate strip 29 in the joining region being greater than the thickness 37 of the substrate strip 29 when not pressed in, the result being that the substrate strip 29 and the facing layer 19 engage like teeth in the joining regions 34 and side surfaces 38.

If the temperature for the reshaping process is suitably adjusted in accordance with the materials used for the substrate strip 29, the heat-activatable adhesive 33 and the facing layer 19, they are converted into a viscous melt or plasticised in the joining regions 34, so that the materials flow into one another and produce a strong joint after solidifying. In addition the heat-activatable adhesive 33, which is adhesive at room temperature, can be liquid at the higher reshaping temperature, and can thus penetrate both into the substrate strip 29 and into the facing layer 19.

As also shown from FIG. 5, the anchoring parts 31 in the joining regions 34 can be reshaped by the heat of a heatable punch 39, or can be melted away. In the latter case the melt penetrates into the fabric-like base material of the facing layer 19 and produces a firm welded joint after solidification. During thermal reshaping also, the adhesive strength of the burr strip can be altered by altering the total area.

Figure 6:
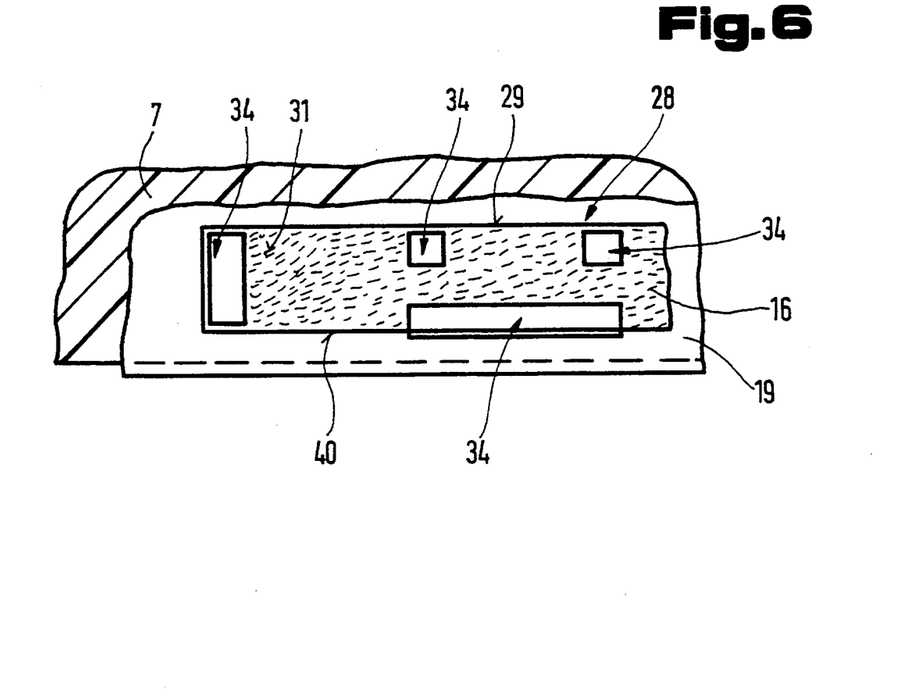
FIG. 6 shows a joining device and facing layer in plan view.

FIG. 6 shows the joining device 28 with a burr strip 16 on the supporting member 7 comprising the facing layer 19. The burr strip 16 comprises the substrate strip 29, made e.g. of heat-deformable plastics, and with anchoring parts 31 on top. In the joining regions 34, the anchoring parts 31 are melted off under pressure and temperature, and the melt enters the base material of the substrate strip 29 and the facing layer 19.

The joining regions 34 can be disposed in any desired grid form. For example the joining regions 34 can be disposed inside the contour formed by the burr strip 16, or alternatively may overlap a side edge 40 of the burr strip 16. In this manner the durability and consequently the resistance of the joining device 28 to tearing can be determined by the number, arrangement and size of the joining regions 34. Alternatively the number of anchoring parts 31 determining the adhesive strength of two co-operating burr strips can be influenced by melting away or reshaping at certain places, in order if required to reduce the adhesive strength for easier release of the seat cover 15.

Figure 7:
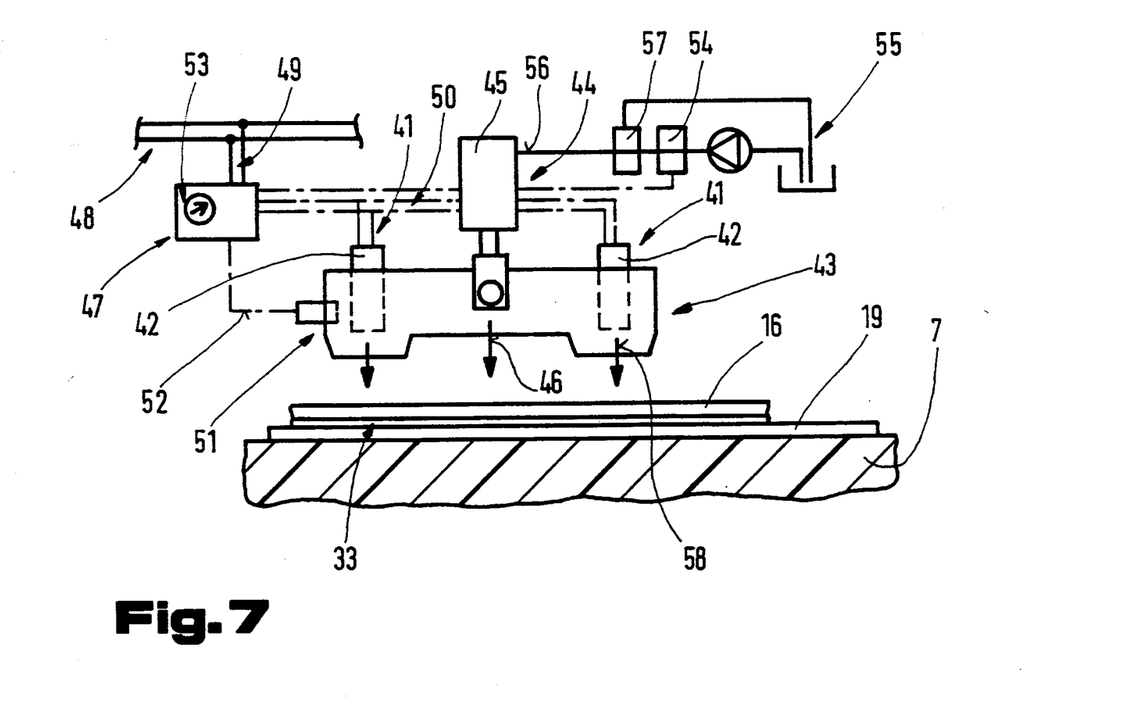
FIG. 7 is a diagram of a joining device comprising a heatable die.

FIG. 7 diagrammatically shows the method of joining the burr strip 16 to a facing layer 19 covering the supporting member 7. A die 43 provided with a heating arrangement 41, e.g. heating cartridges 42, is movable by a feed device 44, e.g. a pressure-actuated cylinder 45, in the direction (arrow 46) of the burr strip 16, which has been positioned on the facing layer 19. The burr strip 16 can be held pre-positioned by the adhesive 33, e.g. a heat-activatable adhesive on the facing layer 19. The heating arrangement 41 is supplied with electric energy via lines 49, 50 from a supply 48, by means of an automatic control device 47 in front of the heating cartridges 42. A temperature sensor 51 is disposed in the die 43 and connected to the automatic control device 47 by a line 52. In this manner the energy supply can be adjusted to obtain a constant temperature in die 43, which is required for the process.

An additional control element such as a timer 53 and valve 54 can control a system 55 for supplying pressure to the cylinder 45, thus controlling the holding time of the die 43 for melting and joining the burr strip 16 to the facing layer 19. An excess-pressure valve 57 disposed in the pressure line 56 to the cylinder 45 can also be used to adjust the pressure (arrow 58) as required for the process, so that all the parameters influencing the process can be preselected in accordance with the materials to be joined.

Figure 8:
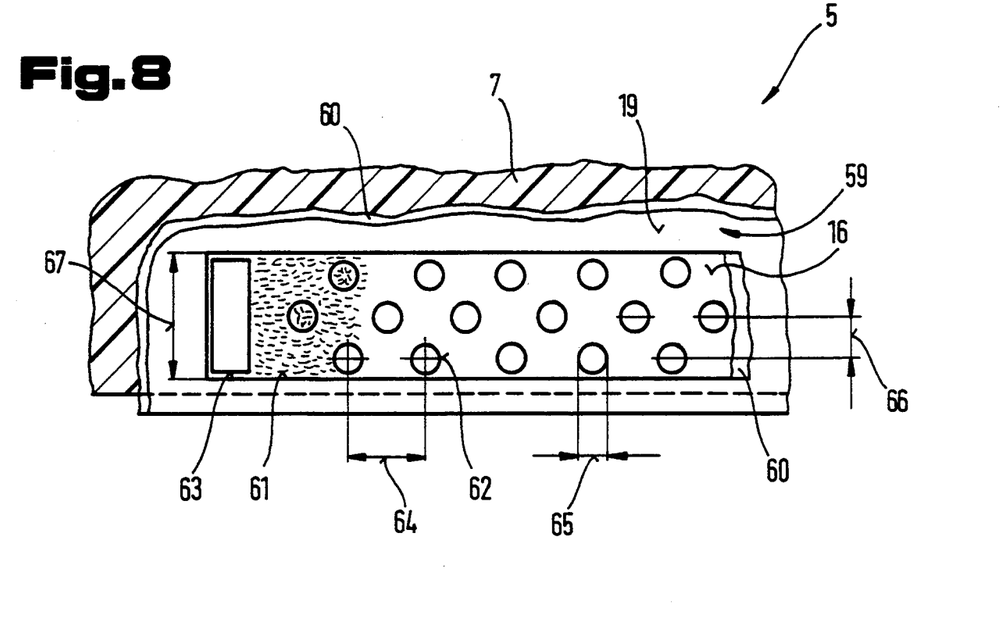
FIG. 8 is a simplified diagram in plan view of a joining device disposed on a facing layer and having joining regions according to the invention.
Figure 9:
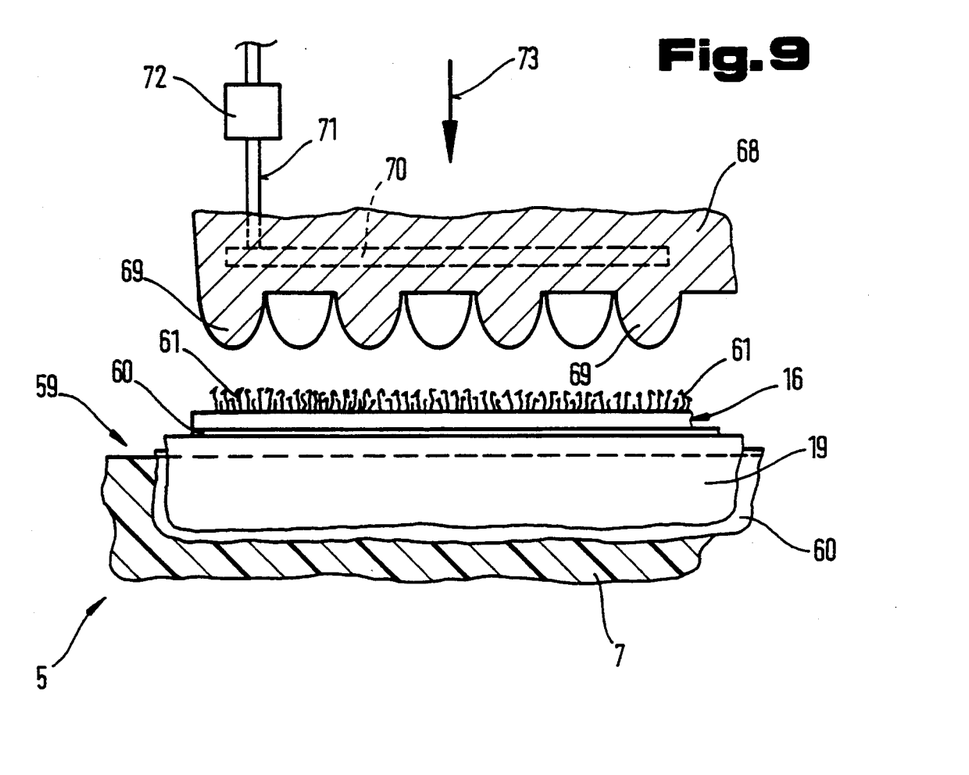
FIG. 9 is a side view of the joining device in FIG. 8, shown in section and with the associated die for the joining devices in side view, likewise in simplified diagrammatic form.

FIGS. 8 and 9 show an underside 59 of a seat cushion 5. The underside 59 is formed by a facing layer 19, e.g. of flameproof material or a network or knitted or unwoven fabric of natural or synthetic fibres, and is secured to a supporting member 7, e.g. with interposition of an adhesive layer 60. A joining device (a burr strip 16) is disposed on the facing layer 19 so as to join it to the seat cover 15 shown in FIG. 2. The top surface of the burr strip 16 has burr threads 61 which become hooked to a co-operating part pressed upon them and thus firmly secure or join the two parts. In order reliably to prevent accidental tearing or loosening of the joining device or burr strip 16 from the facing layer 19, the burr strip 16 is connected to the facing layer 19 in the joining regions 62 and 63. To this end, the burr strip 16 is positioned over an adhesive layer 60 on the facing layer 19, e.g. by using brackets or similar means. Next, the joining regions 62, 63 where the burr strip 16 is provided with heat-deformable materials or consists entirely of such heat-deformable materials are heated, whereupon the burr threads are deformed, as indicated by a different representation in the diagram, so that their adhesive properties can be reduced if required. The joining regions 62 and 63 can have various shapes, or alternatively identical or identically-disposed joining regions will be adequate.

In the present embodiment the joining regions have a spacing 64 which is a multiple of a diameter 65 of a joining region 62. The rows of joining regions 62 are offset from one another by half the spacing and have a transverse spacing 66 which can be slightly greater than the diameter 65 of the joining regions 62.

The result is a grid of securing or joining places between the burr strip 16 and the facing layer 19, and as a result of the heat energy (above the plasticizing or, if required, even above the melting-point of the materials in the joining region) applied to the joining regions 62 on the burr strip, the burr strip melts or is deformed, and is thus pressed or flows into the facing layer 16 underneath, thus firmly anchoring the burr strip in the facing layer 19.

The adhesive strength of the joining device can be altered via the ratio of the total area of the joining regions 62 to the total area of the burr strip 16, particularly when the joining regions 62, 63 make up a large proportion of the total area of the burr strip 16. This reduces the risk that the burr strip 16 will be torn off or torn loose when the seat cover 15 is removed from the facing layer 19.

It has been found advantageous if the joining region 63 at the end of the burr strip 16 extends over the entire width 67 thereof, so as reliably to prevent the burr strip 16 coming loose from the facing layer 19 even at the highly-stressed end region.

Of course, the grid spacing of the joining regions 62 can be varied as required, and fewer joining regions per unit area of burr strip 16 can be provided if the stresses are lower. Alternatively also, the joining regions can have any desired two-dimensional shape instead of the circular variant.

FIG. 9 shows the seat cushion 5 in front view, as before showing the supporting member 7, the adhesive layer 60, the facing layer 19, the burr strip 16 and the adhesive layer 60 connecting the burr strip 16 to the facing layer 19. As also shown, the threads 61 of the burr strip 16 are not yet deformed. A ram 68 formed with projections or noses 69 is disposed above the burr strip 16. Projections 69 have a cross-section substantially corresponding to one of the joining regions 62 and 63, but their underside has the shape of a spherical cap or an elliptical cross-section. The complete ram 68 is heated by rods 70, one of which is shown, and which are connected by leads 71 to a control device 72 for regulating and monitoring the temperature. The control device 72 is connected to an energy source, e.g. a power supply network of an electricity supply undertaking.

The ram 68 is heated by rods 70 to a temperature between 60° C. and 200° C., preferably 100° C. As a result of this temperature, the plastics in the burr strip, disposed at least in the joining regions 62 and 63, is plasticised or begins to melt and can penetrate into the fibre structure of the facing layer 19 underneath. This process is assisted by the compressive force 73 applied by ram 68 (symbolised by an arrow), so that the plasticised plastics is also pressed into the fabric underneath. At the same time the adhesive in the adhesive layer 60 is heated and its fluidity changes, so that as a result of the applied pressure and temperature, the adhesive is uniformly distributed or pressed even more deeply into the facing layer 19, resulting in intimate interlocking and joining between the adhesive and the facing layer 19 or burr strip 16.

If the cycle time is not sufficient to wait until the adhesive in layer 60 melts, the seat cushion 5 bearing the burr strip 16, after the burr strip 16 has been joined to the facing layer 19, can be conveyed through a heating tunnel, where a temperature between 100° C. and 200° C. can be applied for a correspondingly longer time, so that the adhesive in layer 60 completely softens.

In that case also, after leaving the heating tunnel, the seat cushion 5 can be briefly subjected to pressure so that the adhesive layer is uniformly distributed through the fabric, resulting in stronger adhesion between the burr strip 16 and the facing layer 19.

A particularly intimate join between the burr strip 16 and the facing layer 19 is achieved if the burr strip 19 has a substantially smooth surface in continuous or knitted form.

Figure 10:
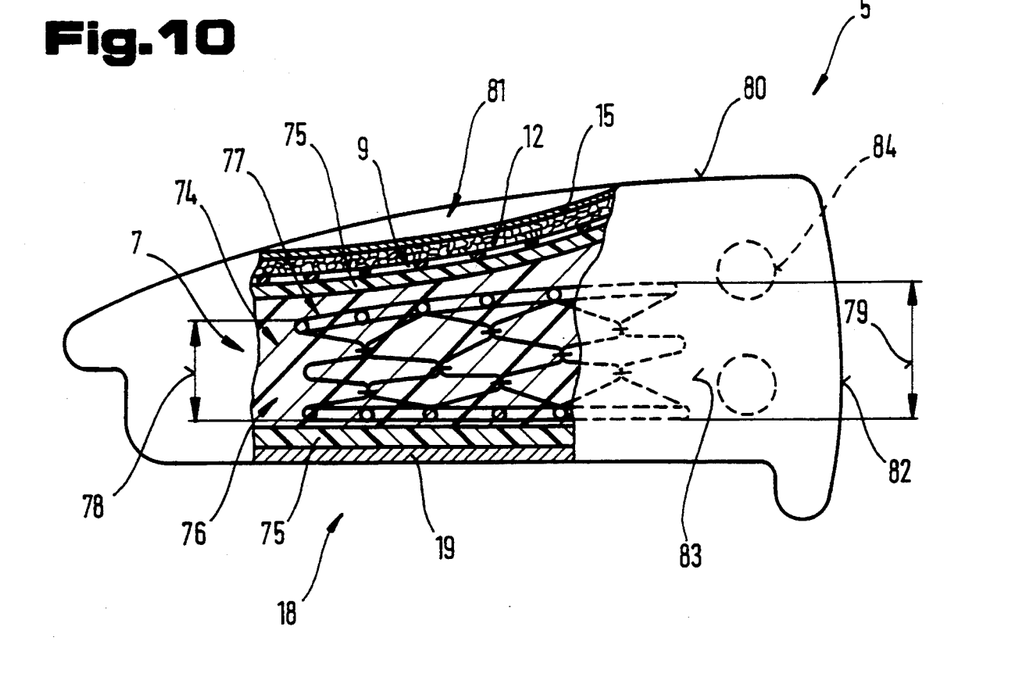
FIG. 10 shows another embodiment of a seat cushion in side view, partly in section.

FIG. 10 shows another embodiment of a seat cushion 5.

The supporting member 7 of cushion 5 comprises a central part 74, a sheath layer 75 surrounding the central part and an intermediate layer 9, a flame-retarding layer 12 and the seat cover 15 on the top surface and side surface of the cushion 5. On the underside 18 of cushion 5, the facing layer 19 is directly applied to the supporting member 7.

The central part 74 of the seat cushion 5 comprises a foam core 76 having a relatively high specific gravity of 60 to 150 kg per m$^3$. Preferably the specific gravity is 90 kg per m$^3$. A spring core 77 is embedded by foaming in the foam core 78. The spring core 77, where it faces the cushion 4, more particularly the back cushion, has a height 78 which is less than the height 79 near the user's knees. These different heights 78, 79 of spring core 77 can be obtained by suitable manufacture of the spring core 77 or by deforming the spring core 77 during manufacture of the foam core 76.

The foam core 76, which is relatively hard because of its high specific gravity, is surrounded by the sheath layer 75, which can have a thickness between 1 cm and 5 cm, preferably 3 cm. The specific gravity of the sheath layer 75 is considerably less than that of the foam core 76, and is e.g. 40 kg to 45 kg per m$^3$. The user of the cushion 4 therefore has a comfortable seat, since the seat cushion 5 yields softly in the first moment, whereas at an increasing depth the resistance becomes stronger, so that the seat has a pleasant feel.

This increase in the seat resistance is also assisted by the flame-retarding layer 12, which is made of plastics foam and is also relatively soft.

On the other hand, the foam layers are prevented from collapsing by the core layer, which is relatively heavy and therefore resistant.

In order to prevent the user slipping and displacing the load on cushion 5, a top surface 80 of cushion 5 can be formed with a recess 81 which, in addition to the forwardly sloping construction of cushion 5, prevents slipping in the direction of an end face 82 of cushion 5 remote from cushion 4, i.e. from the back cushion.

Optionally also, as diagrammatically shown by broken lines, the side surfaces 83 can be formed with recesses 84 which extend into the interior of the foam core 76 through the sheath layer 75, to ensure adequate dissipation of moisture or a plentiful air exchange during prolonged sitting on cushion 5.

At each movement, a corresponding volume of air is exchanged via the recesses or cavities 84, thus dissipating the resulting moisture in the form of water-vapour.

This prevents the seat cushion 5 from becoming excessively moist, resulting in collapse of the plastics foam, more particularly polyurethane foam, particularly when the cushion 5 is used in aircraft flying into different climatic zones or if the seat is in prolonged use. With regard to the construction of the recesses, reference should be made to the parallel application by the same Applicants - WO-OS 88/09731.

Figure 11:
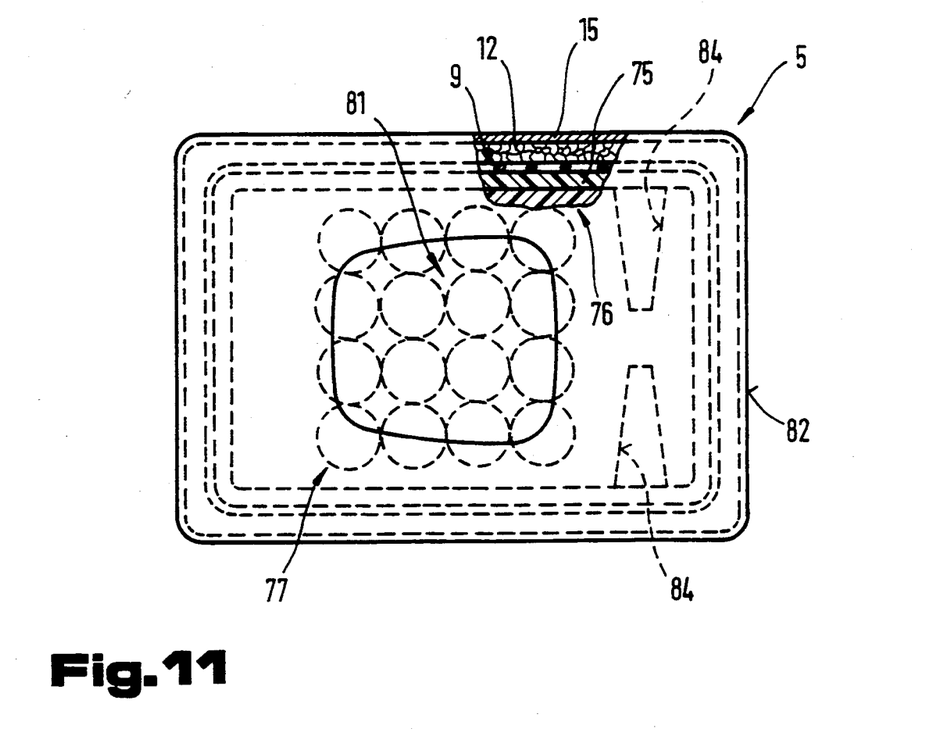
FIG. 11 shows the cushion in FIG. 10 in plan view, partly in section.

FIG. 11 is a plan view of the seat cushion 5, also showing the recesses 84 extending into the foam core 76. FIG. 11 also shows a possible shape of the recess 81 at the place where a user is sitting on the cushion 5. As can be seen, towards the front end 82 of the cushion 5 the recess 81 is adapted to the shape of the user's thigh.

Figure 12:
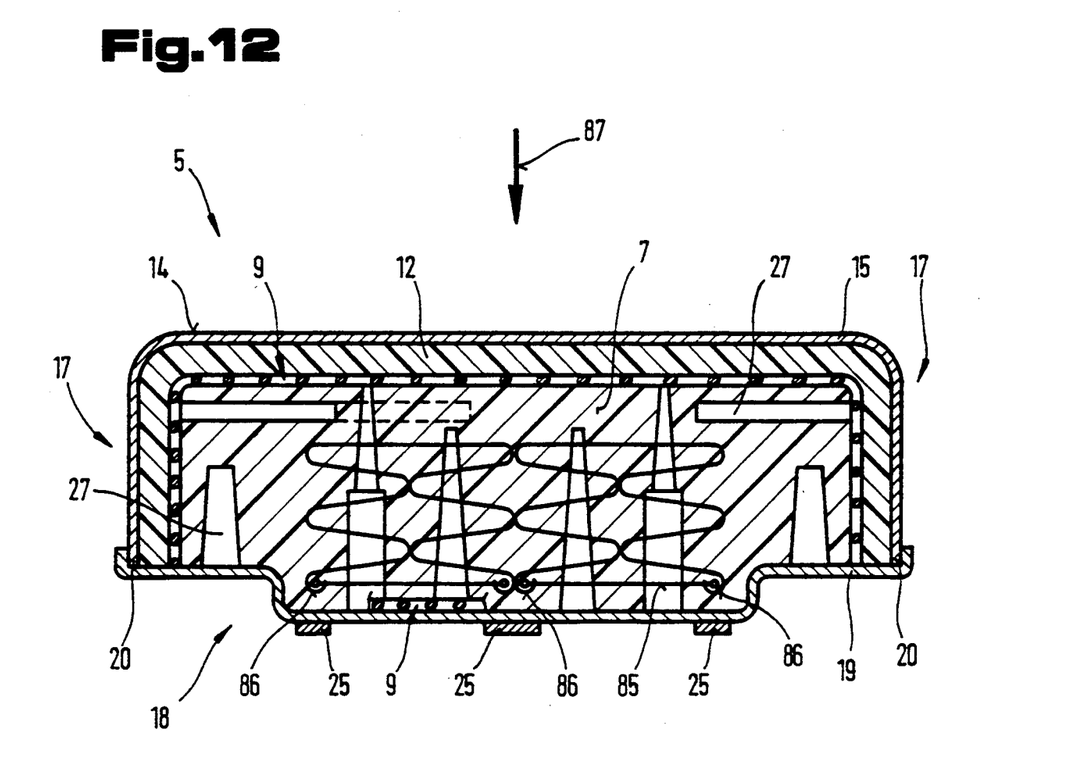
FIG. 12 shows another variant embodiment of a seat cushion in front view, in section and in simplified diagrammatic form.

FIG. 12 shows another embodiment of a seat cushion 5 which is substantially similar in structure to the previously-described embodiments, so that like reference numbers are used for like parts. Cushion 5 has a spring core 85, to prevent the supporting member 7 wearing out and delay the collapse of the foam core resulting from this overload. As before, a facing layer 19 is disposed on the underside 18 of cushion 5, whereas the flame-retarding layer 12 in the region of the seat surface 14 is covered by a flameproof seat cover 15 which also extends over the side surfaces 17 of cushion 5. As before, the facing layer 19 overlaps the edges 20, resulting in the previously-described advantages. An intermediate layer 9 of non-flammable or high temperature-resistant fibres or threads is disposed between the flame-retarding layer 12 and the supporting member 7. As shown by the diagram of the spring core 85, there are joints 86 between the individual parts of the spring core. At these joints 86, when the seat is loaded in the direction of arrow 87, a relatively high stress is exerted on that layer of the supporting member between the facing layer 19 and the end of the spring core 85 facing the underside 18. Reinforcing supports 25, which can be in strip form, are provided to prevent the supporting member 7 breaking or the facing layer 19 tearing in this region.

Of course, the reinforcing strips can be disposed between the facing layer 19 and the supporting member 7, instead of being disposed on the side of the facing layer remote from the supporting member 7.

In addition, even in cushions 5 provided with flame-retarding layers according to the invention, the supporting member 7 can be formed with recesses 27 to ensure ventilation and consequent removal of moisture, particularly when the seat is used for longer journeys, e.g. long-distance flights.

Also, as shown in the region of the underside 18 of cushion 5 in FIG. 12, an intermediate layer 9 of the previously-described kind, consisting of high temperature-resistant fibres or threads, can be disposed likewise between the facing layer 19 and the supporting member 7.

In general, the low-flammable seat cover 15 can be made of compositions of cotton and polyester, e.g. 81% cotton and 19% polyester, or alternatively seat covers of 59% wool, 33% cotton and 8% polyester can be used.

The plastics foam for making the supporting member 7 can be a cold-curing moulded foam, preferably having a specific gravity of 15 to 60 kg/m$^3$, preferably 40 kg/m$^3$. The supporting member is also mixed with a pulverulent flame retardant 8, which can consist of melamine resin and/or aluminium hydroxide or a mixture of the two.

The intermediate layer 9 preferably comprises glass or carbon-fibre mats weighing between 150 and 350 g/m$^2$. This provides a favourable relation between the increase in weight through the use of the intermediate layer 9 and the flame-retarding effect thereof. However, intermediate layers 9 having a different weight can also be used.

Of course, the high temperature-resistant threads or fibres can be combined in any desired manner. For example use can be made of woven and knitted fabrics made of these fibres or threads or fibres consisting of similar threads, and a very wide range of materials can be used singly or mixed together, in order to offer maximum resistance for a longer time to flames acting from the exterior. Preferably, however, glass, ceramics, graphite or high temperature-resistant metals are used as base materials for the threads and fibres.

The mesh width obtained in the knitted or woven fabrics or nets or lattices of high temperature-resistant fibres or threads results in a corresponding "screen effect" which prevents the flame travelling through the small openings in the screen, thus reducing direct burning in the region of the supporting member 7 disposed behind the intermediate layer 9. On the other hand, a flame evolving inside the supporting member cannot spread from the inside to other regions of the seat cover, and consequently the air supplied to the flame in these regions of the supporting member cannot be increased, thus additionally preventing the spread of fire in the seat.

The flame-retarding layer 12 preferably comprises a foam plastics having a specific gravity of about 20 to 60 kg/m$^3$. A polyether foam is generally used. The polyether foam is formed into blocks which, after foaming, are cut into plates or webs having the desired layer thickness. The plates are then impregnated with a liquid flame retardant, e.g. a polyurethane type 64 (Messrs Bayer), . . . parts by weight of which are mixed with 80 parts by weight of A1 (OH)3. This hydrated aluminium oxide is stirred into the polyurethane.

Of course, the arrangement of individual components can be varied at will or differently combined according to the invention, in addition to the embodiments shown.

All individual features in the embodiments shown can be independent solutions according to the invention.

List of reference numbers

| | |
|---|---|
| 1 Double sofa seat | 41 Heating arrangement |
| 2 Seat | 42 Heating cartridge |
| 3 Seat | 43 Die |
| 4 Cushion | 44 Feed device |
| 5 Seat cushion | 45 Cylinder |
| 6 Supporting frame | 46 Arrow |
| 7 Supporting member | 47 Automatic control device |
| 8 Flame retardant | 48 Energy supply |
| 9 Intermediate layer | 49 Lead |
| 10 Thread | 50 Lead |
| 11 Thread | 51 Temperature sensor |
| 12 Flame-retarding layer | 52 Lead |
| 13 Adhesive | 53 Timer |
| 14 Seat surface | 54 Valve |
| 15 Seat cover | 55 Pressure supply system |
| 16 Burr tape | 56 Pressure line |
| 17 Side surface | 57 Excess-pressure valve |
| 18 Underside | 58 Arrow |
| 19 Facing layer | 59 Underside |
| 20 Edge | 60 Adhesive layer |
| 21 Edge | 61 Burr threads |
| 22 Edge | 62 Joint region |
| 23 Edge | 63 Joint region |
| 24 Part | 64 Spacing |
| 25 Reinforcing support | 65 Diameter |
| 26 Spar | 66 Transverse spacing |
| 27 Recess | 67 Width |
| 28 Joining device | 68 Ram |
| 29 Substrate strip | 69 Projection |
| 30 Upper surface | 70 Heating-rod |
| 31 Anchoring part | 71 Lead |
| 32 Joining surface | 72 Control device |
| 33 Adhesive | 73 Compressive force |
| 34 Joint region | 74 Central part |
| 35 Depth | 75 Sheath layer |
| 36 Thickness | 76 Foam core |
| 37 Thickness | 77 Spring core |
| 38 Side surface | 78 Height |
| 39 Punch | 79 Height |
| 40 Side edge | 80 Top surface |
| | 81 Recess |
| | 82 End face |
| | 83 Side surface |
| | 84 Recess |
| | 85 spring core |
| | 86 Joint |
| | 87 Arrow |

We claim:

1. A seat comprising a foam plastics cushion having a seat surface, an underside remote from the seat surface and side surfaces between the seat surface and the underside, the side surfaces defining edges with the seat surface and the underside, and the cushion comprising
- (a) a supporting member of an open-cell resilient plastics foam having a first specific gravity, the supporting member having a top surface facing the seat surface,
- (b) an intermediate layer of high temperature-resistant threads forming a network arranged on the top surface of the supporting member,
- (c) a flame-proof layer of an open-cell resilient plastics foam impregnated with a liquid flame-proofing agent and having a second specific gravity different from the first specific gravity, the flame-proof layer covering the intermediate layer,
    - (1) the supporting member and the intermediate layer, and the intermediate layer and the flame-proof layer being respectively bonded to each other by an adhesive at regions distributed over the surfaces thereof, and
    - (2) the intermediate layer and the flame-proof layer extending at least along the seat surface, and
- (d) a flame-resistant upholstery material covering the seat surface, the side surfaces and the underside of the cushion having a seat surface, an underside remote from the seat surface and side surfaces between the seat surface and the underside, the side surfaces defining edges with the seat surface and the underside, wherein the improvement comprises
- (e) a facing layer of a flame-proof fabric applied to the supporting member on the underside of the cushion.

2. The cushion of claim 1, wherein the intermediate layer and the flame-proof layer extend over the side surfaces of the cushion.

3. The cushion of claim 1, wherein the facing layer is adhesively bonded to the supporting member.

4. The cushion of claim 1, wherein the facing layer overlaps the flame-proof layer at the edges defined by the side faces and the underside.

5. The cushion of claim 4, wherein the facing layer overlaps the flame-proof layer at the edges defined by the side faces and the seat surface.

6. The cushion of claim 1, wherein the intermediate layer extends between the supporting member and the facing layer at the underside of the cushion.

7. The cushion of claim 1, wherein the supporting member is foamed on the facing layer to form an integral unit therewith.

8. The cushion of claim 1, further comprising reinforcing overlays at regions of the facing layer at a side thereof remote from the supporting member.

9. The cushion of claim 8, further comprising a spring core incorporated in the supporting member and comprising several spring parts connected at joints, the reinforcing overlays on the facing layer being in alignment with the joints.

10. The cushion of claim 1, further comprising burr strips on the facing layer at a side thereof remote from the supporting member for securing the flame-resistant upholstery material covering.

* * * * *